United States Patent
Wallace

(10) Patent No.: US 9,945,926 B2
(45) Date of Patent: Apr. 17, 2018

(54) METHOD OF DESIGNING BANDWIDTH EFFICIENT RANGING WAVEFORMS

(71) Applicant: Vesperix Corporation, Falls Church, VA (US)

(72) Inventor: Thomas H. Wallace, Arlington, VA (US)

(73) Assignee: Vesperix Corporation, Falls Church, VA (US)

( * ) Notice: Subject to any disclaimer, the term of this patent is extended or adjusted under 35 U.S.C. 154(b) by 660 days.

(21) Appl. No.: 14/554,234

(22) Filed: Nov. 26, 2014

(65) Prior Publication Data

US 2016/0291163 A1 Oct. 6, 2016

(51) Int. Cl.
*G01S 1/04* (2006.01)
*G01S 11/02* (2010.01)
*G01S 11/08* (2006.01)

(52) U.S. Cl.
CPC .............. *G01S 1/042* (2013.01); *G01S 11/02* (2013.01); *G01S 11/08* (2013.01)

(58) Field of Classification Search
CPC ........................................................ G01S 1/42
USPC ..................................................... 342/357.59
See application file for complete search history.

(56) References Cited

U.S. PATENT DOCUMENTS

| | | | | |
|---|---|---|---|---|
| 7,366,243 | B1* | 4/2008 | McCrady | G01S 1/20 342/357.64 |
| 7,987,410 | B2* | 7/2011 | Hedberg | H03M 13/1102 714/774 |
| 2010/0098178 | A1* | 4/2010 | Yang | H03M 13/275 375/260 |
| 2011/0035168 | A1* | 2/2011 | Lelong | H04B 3/46 702/66 |
| 2012/0069804 | A1* | 3/2012 | Kim | H04W 72/0453 370/329 |
| 2012/0238227 | A1* | 9/2012 | Gao | H04W 16/10 455/120 |
| 2012/0320787 | A1* | 12/2012 | Sugar | G01S 5/021 370/252 |
| 2015/0035571 | A1* | 2/2015 | Chettimada | H03K 7/08 327/142 |

OTHER PUBLICATIONS

Celebi, Hasari et al., "Cognitive Positioning Systems", IEEE Transactions on Wireless Communications, Dec. 2007, pp. 4475-4483, vol. 6, No. 12.*

(Continued)

*Primary Examiner* — Gregory C. Issing
*Assistant Examiner* — Helena H Seraydaryan
(74) *Attorney, Agent, or Firm* — Maine Cernota & Rardin

(57) ABSTRACT

A method of designing bandwidth-efficient ranging waveforms provides waveforms usable in non-contiguous spectral bands that have low SNR thresholds and are usable at low and moderate SNR's. A set of allowed frequencies in the desired spectral region is divided into bands. A first group of band combinations is selected having a required accuracy at high SNR. Those band combinations in the first group that have the smallest autocorrelation secondary peaks are selected as a second group. Finally, waveforms are selected that occupy band combinations from the second group and have desired factors such as simultaneous or sequential transmission, a desired order of sequential transmission, and/or a desired modulation of the individual bands. Multiple simultaneous transmissions can share a set of bands, and individual transmitters can employ different modulating waveforms with good cross-correlation. In embodiments, waveforms having 4-6 bands provide a SNR threshold only 6-9 dB lower than conventional waveforms.

11 Claims, 5 Drawing Sheets

(56) References Cited

OTHER PUBLICATIONS

Braasch, Michael S. et al., "GPS Receiver Architectures and Measurements", Proceedings of the IEEE, Jan. 1999, pp. 48-64, vol. 87, No. 1.
Carter, G. Clifford, "Coherence and Time Delay Estimation", Proceedings of the IEEE, Feb. 1987, pp. 236-255, vol. 75, No. 2.
Chazan, Dan et al., "Improved Lower Bounds on Signal Parameter Estimation", IEEE Transactions on Information Theory, Jan. 1975, pp. 90-93.
Cuomo, Kevin M. et al., "Ultrawide-Band Coherent Processing", IEEE Transactions on Antennas and Propagation, Jun. 1999, pp. 1094-1107; vol. 47, No. 6.
Gezici, Sinan et al., "Fundamental Limits on Time Delay Estimation in Dispersed Spectrum Cognitive Radio Systems", IEEE Transactions on Wireless Communications, Jan. 2009, pp. 78-83, vol. 8, No. 1.
Levanon, Nadav; "Multifrequency Complementary Phase-Coded Radar Signal", Tel Aviv University, 2000, 6 pages.
Pierce, J.A.; "Omega", IEEE Transactions on Aerospace and Electronic Systems, Dec. 1965, pp. 206-215, vol. AES-1, No. 3.
Weinstein, Ehud et al., "Fundamental Limitations in Passive Time-Delay Estimation-Part II: Wide-Band Systems", IEEE Transactions on Acoustics, Speech, and Signal Processing, Oct. 1984, pp. 1064-1078; vol. ASSP-32; No. 5.

\* cited by examiner

METHOD OF DESIGNING BANDWIDTH EFFICIENT RANGING WAVEFORMS

FIELD OF THE INVENTION

The invention relates to ranging, and more particularly, to radio frequency ranging applications such as navigation and time transfer.

BACKGROUND OF THE INVENTION

It is common for a user to require high accuracy ranging for purposes such as positioning, navigation, or time transfer, and it is well known that accurate ranging requires radio frequency signals with large bandwidths. For example, satellite navigation systems such as GPS or GLONASS occupy several megahertz of spectrum in dedicated navigation bands. Systems for accurate ranging, such as time transfer or navigation systems, typically use a conventional high resolution ranging waveform. Examples of these conventional waveforms include short pulses, linear frequency modulated chirps, binary phase shift keyed signals, and binary offset carrier modulated signals.

All of these conventional waveforms require broad contiguous spectral bands. Outside of the dedicated navigation bands, which are already occupied by existing navigation signals, it can be extremely difficult or impossible to obtain allocation of broad, contiguous spectral bands that would be suitable for broadcasting conventional, high-accuracy ranging waveforms. Instead, the user is often constrained to operate in spectral bands where only a small number of noncontiguous bands are available, as is the case in the crowded VHF and UHF bands, for example.

One approach is to use a waveform that occupies available discontinuous spectral bands. However, until the present invention there was no known method of designing optimized discontinuous waveforms, and so this approach generally either provided ambiguous range estimates or provided accurate ranging only at unrealistically high Signal-to-Noise ratios ("SNR's"). Examples include the OMEGA radio navigation system (Pierce. 1965), which employed multiple pulsed sinusoids, but had ambiguities of hundreds of kilometers in the estimated location. Several works in the related areas of cognitive ranging (Celebi & Arslan. 2007; Gezici et. al., 2009) and radar (Cuomi. Piau. & Mahan, 1999; Levanon. 2000) have also addressed ranging using discontinuous spectral bands, and have suffered from similar ambiguity or SNR limitations.

What is needed, therefore, is a method of designing bandwidth efficient ranging waveforms that will provide accurate and unambiguous ranging at moderate to low SNR's.

SUMMARY OF THE INVENTION

A method is disclosed of designing bandwidth-efficient ranging waveforms that provide accurate ranging at moderate to low SNR's. In particular, the design method described herein provides waveforms that are usable in narrow, discontinuous, channelized bands, such as communications bands, which are too narrow for the use of conventional broadband ranging waveforms, and have good SNR threshold behavior, producing waveforms that are usable at low and moderate SNR's.

The bandwidth efficient ranging waveforms provided by the present invention comprise coherent transmissions in a plurality of noncontiguous spectral regions, thereby providing high accuracy ranging using much less spectrum than conventional broadband navigation waveforms. Bandwidth efficient ranging waveforms can be designed according to the present method that fit within the available narrowband channels, and/or avoid existing signals in crowded bands. They can be designed to use a fixed set of noncontiguous spectral regions, or to alter the set of noncontiguous spectral regions they use over time, for example to avoid other users, share spectrum with other users, or to render the waveform more difficult to intercept or jam.

In addition to considering the ranging accuracy of a candidate waveform at high signal-to-noise ratios (SNR's), the design method of the present invention also requires consideration of the "threshold" SNR of the candidate waveform. Typically, the ranging accuracy of a candidate waveform degrades suddenly, and almost discontinuously, when it reaches a certain "threshold" SNR, as is illustrated for example in FIGS. 1 and 3, discussed in more detail below. This threshold behavior appears to be nearly universal (Carter, 1987; Weiss & Weinstein, 1983; Weinstein & Weiss, 1984). Nevertheless, if a candidate waveform for some reason did not follow this typical pattern, then its threshold SNR would be defined herein as the SNR where the ranging accuracy of the waveform departs by more than 3 dB from the relationship between accuracy and SNR given by the Cramer-Rao bound (see equation (1) below).

The method of the present invention thereby provides bandwidth efficient ranging waveforms having performance that is similar to conventional broadband, spectrally continuous ranging waveforms with respect to both high SNR ranging accuracy and SNR threshold, while using only a small fraction of the bandwidth used by conventional ranging waveforms.

First Design Factor: High SNR Ranging Accuracy

The performance of a ranging waveform is governed by its autocorrelation. Because the autocorrelation is the Fourier transform of the power spectral density, standard results in estimation theory allow the ranging accuracy at high SNR to be correlated with the spectral bandwidth of the waveform. At high signal to noise ratios, the ranging accuracy is proportional to a specific measure of bandwidth $\beta$, as given by the Cramer-Rao bound on the standard deviation of the range estimate. The definition of $\beta$ is described in more detail below (see equation 2 below). Conventional navigation signals have large $\beta$'s because they occupy large contiguous spectral regions.

It is relatively simple to design spectrally non-contiguous waveforms that will provide a ranging accuracy at very high SNR that is similar to conventional broadband waveforms, without occupying a large contiguous spectral region. In the simplest case, a pair of coherent sinusoids can be configured to have any desired $\beta$, simply by adjusting the frequency spacing between the sinusoids.

However, these simple waveforms, including the prior art approaches mentioned above, are not useful for accurate ranging, because they have very poor SNR threshold behavior and typically yield ambiguous and unreliable range estimates at the SNRs encountered in practice.

Second Design Factor: Autocorrelation and SNR Threshold Performance

As noted above, all ranging waveforms have a threshold SNR below which their performance degrades rapidly (Carter, 1987; Weiss & Weinstein, 1983; Weinstein & Weiss, 1984). The method of the present invention provides bandwidth efficient ranging waveforms that are not only accurate at very high SNRs, but also have SNR threshold performance that is similar to conventional broadband ranging waveforms, which makes the bandwidth efficient ranging waveforms of the present invention useful and practical at moderate and low SNR's.

The SNR threshold of a ranging waveform is directly related to the shape of its autocorrelation function (Chazan, Zakai, & Ziv, 1975). In particular, given the matched filter—rectifier design of the optimal receiver for time delay estimation (Helstrom, 1995, Section 7.2), it is possible to obtain the best possible threshold SNR by minimizing the magnitudes of the secondary peaks of the autocorrelation function, and in particular by minimizing the magnitudes of the largest secondary peaks in the autocorrelation function.

The method of the present invention ensures that the resulting bandwidth efficient ranging waveforms meet practical requirements for threshold SNR by examining the autocorrelation functions of candidate waveforms, and selecting those waveforms having the smallest secondary peaks.

One general aspect of the present invention is a method of designing a bandwidth efficient ranging waveform. The method includes obtaining a set of allowed frequencies available for transmission of the bandwidth efficient ranging waveform, determining a required ranging accuracy for the bandwidth efficient ranging waveform as a function of signal-to-noise ratio, dividing the set of allowed frequencies into a plurality of frequency bands, selecting a plurality of candidate waveforms having the required ranging accuracy as a function of SNR, each candidate waveform coherently occupying a noncontiguous combination of at least two of the frequency bands, computing an autocorrelation function for each of the candidate waveforms, each correlation function having a primary peak and at least one secondary peak, selecting from among the plurality of candidate waveforms a set of selected candidate waveforms, the selected candidate waveforms being those waveforms for which the secondary peaks of the corresponding autocorrelation functions have the smallest magnitudes, and selecting the bandwidth efficient ranging waveform from among the selected candidate waveforms according to format criteria.

In some embodiments of this general aspect, the format criteria include a requirement that signal is transmitted simultaneously in all bands of the bandwidth efficient ranging waveform, while in other embodiments, the format criteria include a requirement that signal is transmitted sequentially in all bands of the bandwidth efficient ranging waveform. And in some of these embodiments the format criteria include a requirement that signal is transmitted sequentially in all bands of the bandwidth efficient ranging waveform in a given pseudorandom order.

In any of the preceding method embodiments, the format criteria can include a requirement to exclude all selected candidate waveforms for which a secondary peak of the corresponding autocorrelation function falls within one or more specified delay ranges.

In any of the preceding method embodiments, the selected bandwidth efficient ranging waveform can occupy between three and eight frequency bands.

In any of the preceding method embodiments, the selected bandwidth efficient ranging waveform can have a SNR threshold that is within 10 dB of a SNR threshold of a contiguous ranging waveform having a $\beta$ value that is equal to a $\beta$ value of the selected bandwidth efficient ranging waveform.

In any of the preceding method embodiments, the frequency bands can correspond with frequency channels that are approximately 12.5 kHz wide, 25 kHz wide, or 6.25 kHz wide.

In any of the preceding method embodiments, selecting the bandwidth efficient ranging waveform from among the selected candidate waveforms can include selecting a plurality of the selected candidate waveforms and configuring the bandwidth efficient ranging waveform to transition between the selected candidate waveforms at specified time intervals.

Another general aspect of the present invention is a ranging apparatus that includes an apparatus configured to emit a ranging signal having a bandwidth efficient ranging waveform, said bandwidth efficient ranging waveform occupying between three and eight non-contiguous frequency bands selected from among a set of allowed frequencies, said bandwidth efficient ranging waveform having a high SNR ranging accuracy that is substantially equal to a high SNR ranging accuracy of a contiguous PRBS ranging waveform having a substantially equal bandwidth, and said bandwidth efficient ranging waveform having a SNR threshold that is within 10 dB of a SNR threshold of the contiguous PRBS ranging waveform.

For the ranging apparatus of the preceding embodiment, in some embodiments signal is transmitted simultaneously in all bands of the bandwidth efficient ranging waveform. In other embodiments, signal is transmitted sequentially in all bands of the bandwidth efficient ranging waveform. And in some of these embodiments, signal is transmitted sequentially in all bands of the bandwidth efficient ranging waveform in a given pseudorandom order.

For any of the preceding ranging apparatus embodiments, embodiment are included for which no secondary peaks are included in the autocorrelation of the bandwidth efficient ranging waveform that fall within a specified range of delays.

For any of the preceding ranging apparatus embodiments, the frequency bands can correspond with frequency channels that are approximately 12.5 kHz, 25 kHz wide, or 6.25 kHz wide.

And in any of the preceding ranging apparatus embodiments, selecting the bandwidth efficient ranging waveform from among the selected candidate waveforms can include selecting a plurality of the selected candidate waveforms and configuring the bandwidth efficient ranging waveform to transition between the selected candidate waveforms at specified time intervals.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

A method is disclosed of designing bandwidth-efficient, spectrally non-contiguous ranging waveforms that provide high ranging accuracy at moderate to low SNR's. In particular, the design method described herein provides waveforms that are usable in channelized bands, such as communications bands, which are too narrow for the use of conventional broadband ranging waveforms. In particular, the present method optimizes the autocorrelation functions of the ranging waveforms for good SNR threshold behavior, thereby producing bandwidth efficient ranging waveforms that are usable at low and moderate SNR's.

The bandwidth efficient ranging waveforms provided by the present invention comprise coherent transmissions in a plurality of noncontiguous spectral regions, and thereby provide high accuracy ranging using much less spectrum than conventional broadband navigation waveforms. Bandwidth efficient ranging waveforms can be designed to fit within available narrowband channels, and/or to avoid existing signals in crowded bands. They can be designed to use a fixed set of noncontiguous spectral regions, or to alter the set of noncontiguous spectral regions they use, for example to avoid other users or to render the waveform more difficult to intercept or jam.

Figure 1:
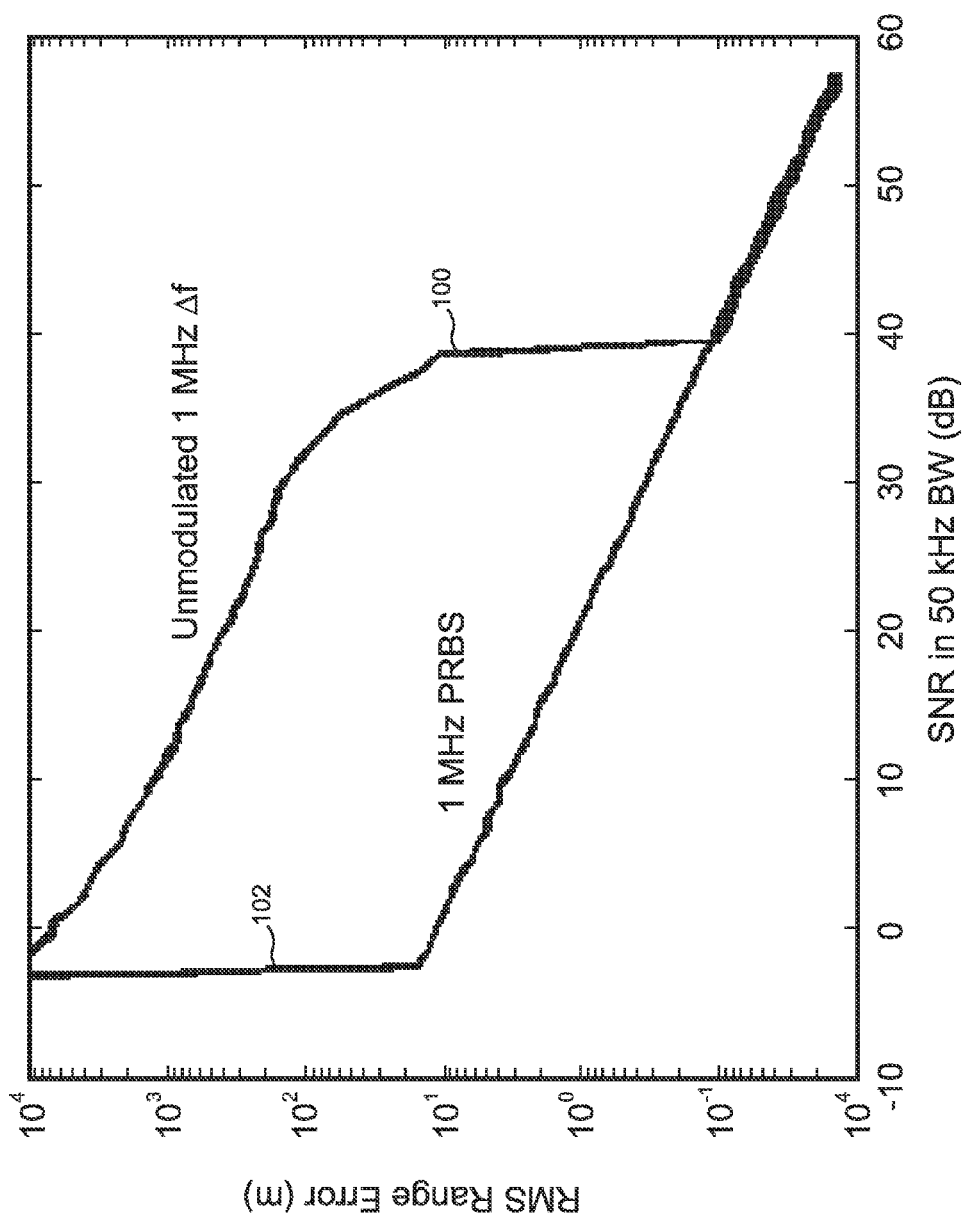
FIG. 1 is a graph of RMS range error versus SNR that compares SNR threshold behaviors of a conventional, contiguous ranging waveform of the prior art based on a 1 MHz Pseudo-Random Binary Sequence ("PRBS") with a simple, non-contiguous waveform of the prior art consisting of a pair of unmodulated sinusoids separated by 1 MHz.

In addition to considering the ranging accuracy of a candidate waveform at high signal-to-noise ratios (SNR's), the design method of the present invention also requires consideration of the "threshold" SNR behavior of the candidate waveform. With reference to FIG. 1, the ranging accuracy of a candidate waveform 100 typically degrades suddenly, and almost discontinuously, at a certain "threshold" SNR. For waveforms that occupy discontinuous spectral regions 100, the threshold typically occurs at a much higher SNR than for a conventional, contiguous waveform 102 that occupies a large, contiguous spectral region. Note that, if for some reason a candidate waveform 100 did not follow this typical pattern as illustrated in FIG. 1, then its threshold SNR would be defined herein as the SNR where the ranging accuracy of the departs by more than 3 dB from the relationship between accuracy and SNR given by the Cramer-Rao bound (see equation 1 below).

The SNR threshold of a ranging waveform is directly related to the shape of the autocorrelation function of the waveform. The present method ensures that the resulting, bandwidth efficient ranging waveforms will meet practical requirements for threshold SNR by examining the autocorrelation functions of candidate waveforms, and selecting those waveforms whose secondary peaks have the smallest magnitudes. The method of the present invention thereby provides bandwidth efficient ranging signals which perform in a manner that is similar to conventional broadband, spectrally continuous ranging waveforms with respect to both accuracy at high SNR's, and SNR threshold performance, while using only a small fraction of the bandwidth used by conventional ranging waveforms.

First Design Factor: High SNR Ranging Accuracy

The performance of a ranging waveform is governed by its autocorrelation function. Because the autocorrelation function is the Fourier transform of the power spectral density, standard results in estimation theory allow the ranging accuracy at high SNR to be correlated with the spectral bandwidth of the waveform. At high signal to noise ratios, ranging accuracy is proportional to a specific measure of bandwidth $\beta$, as given by the Cramer-Rao bound on the standard deviation of the range estimate (Helstrom, 1995):

$$\sigma_{\hat{r}} \geq \frac{c}{\sqrt{SNR}\,\beta} \tag{1}$$

In this expression, c is the signal velocity, SNR is the signal-to-noise ratio, and the bandwidth measure $\beta$ is the RMS bandwidth of the signal power spectral density $S(\omega)$:

$$\beta = \left[\frac{\int_0^\infty \omega^2 S(\omega)^2 \, d\omega}{\int_0^\infty S(\omega)^2 \, d\omega}\right]^{1/2} \tag{2}$$

Figure 2:
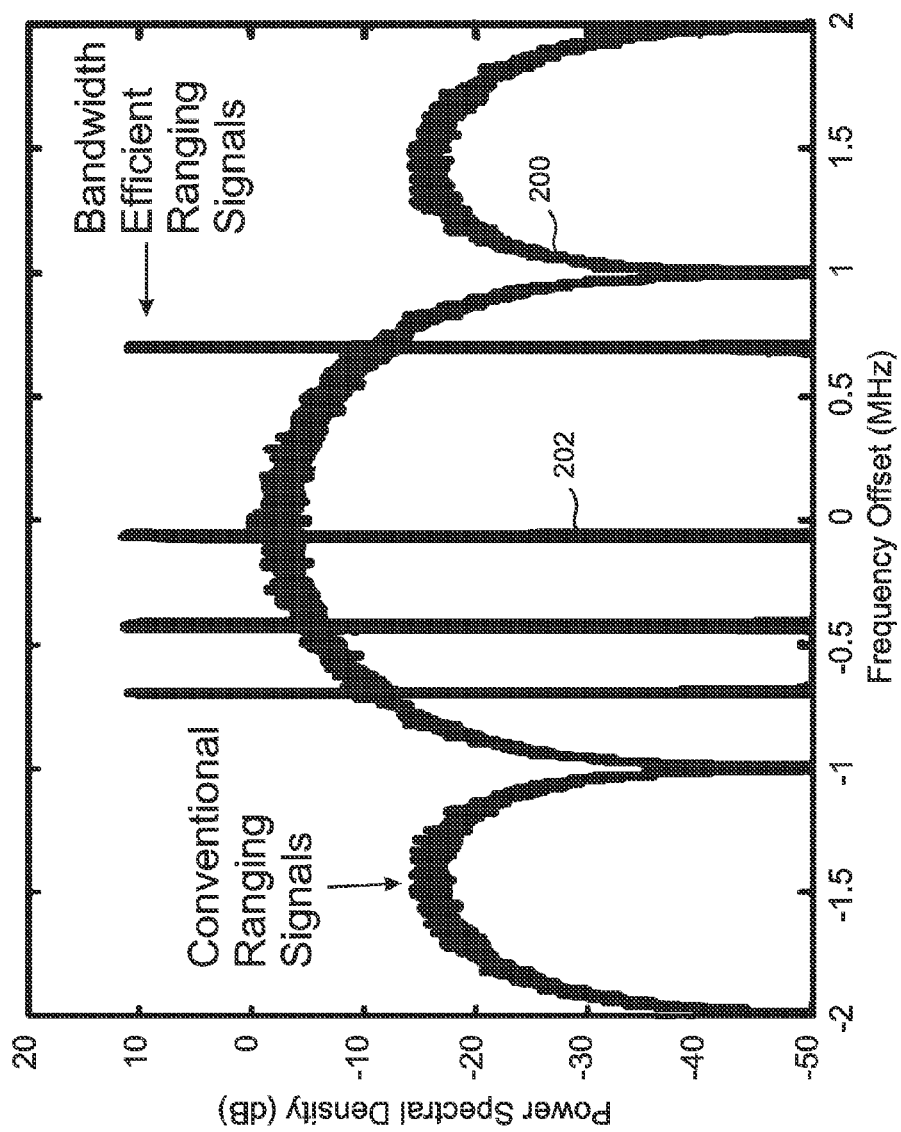
FIG. 2 is a graph of power spectral density versus frequency offset that compares a conventional, contiguous ranging signal of the prior art with a bandwidth efficient ranging signal designed using an embodiment of the present invention.

This bandwidth measure $\beta$ determines ranging accuracy at high signal to noise ratios. With reference to FIG. 2, conventional navigation signals 200 have large $\beta$ because they occupy a large contiguous spectral region.

It is relatively simple to design spectrally non-contiguous waveforms that will provide a ranging accuracy at very high SNR that is similar to conventional waveforms without occupying a large contiguous spectral region. In the simplest case, a pair of coherent sinusoids can be configured to have any desired $\beta$ simply by adjusting the frequency spacing between the sinusoids. An example 100 is presented in FIG. 1. However, these simple waveforms are typically not useful for accurate ranging because they have very poor threshold behavior and typically provide ambiguous and unreliable range measurements at the SNR's that are encountered in practice. The second design factor in the design of bandwidth efficient ranging waveforms is therefore optimization of the threshold performance.

Autocorrelation and Threshold Performance

As mentioned above, all ranging signals have a threshold SNR below which their performance degrades rapidly. This threshold is clearly seen in FIG. 1, which compares the accuracy of a conventional pseudorandom binary sequence phase shift keyed ranging waveform 102 with that of a pair of coherent unmodulated sinusoids of Finite duration 100, with the sinusoids' frequency spacing adjusted to give the same $\beta$.

It can be seen from FIG. 1 that although the performance of the two waveforms at very high SNR (above 40 dB) is similar, the unmodulated pair of sinusoids 100 exhibits very poor SNR threshold behavior, having an SNR threshold of approximately 39 dB, which is more than 40 dB higher than the threshold of a conventional Pseudo-Random Binary Sequence ("PRBS") ranging waveform 102. At SNRs below this threshold, the ranges given by the unmodulated pair of sinusoids 100 are ambiguous, because it is not possible to reliably distinguish the primary autocorrelation peak from the largest secondary peaks. This ambiguity leads to a large increase in the RMS error.

The bandwidth efficient ranging waveforms provided by the present method are not only accurate at high SNRs, but also have good threshold performance, allowing them to provide unambiguous range estimates at moderate and low SNRs.

The SNR threshold behavior of a waveform is directly related to the shape of the autocorrelation function of the waveform. If a waveform is normalized so that its energy is 1, then by definition, the autocorrelation function of the waveform has a maximum magnitude of 1 at zero delay.

A "peak" in a normalized autocorrelation function is defined herein as any point where the function reaches a local maximum, and the "magnitude" of the peak is defined herein as the absolute value of the autocorrelation function at that local maximum. The peak with magnitude 1 at zero delay is referred to herein as the "primary" peak of the autocorrelation function, while any peaks in the autocorrelation function at nonzero delays are referred to herein as "secondary" peaks. Since the magnitudes of the secondary peaks cannot exceed the magnitude of the primary peak, all secondary peaks in a normalized autocorrelation function will have magnitudes less than or equal to 1.

As the magnitude of any of these secondary peaks approaches 1, the threshold performance will be degraded. In particular, if there are any secondary peaks with a magnitude close to 1, in the presence of noise it will be difficult or impossible to determine which peak is the primary peak, and this will result in ambiguous range estimates and large RMS errors. The poor threshold performance of the unmodulated sinusoid waveform 100 in FIG. 1 is due to the fact that the magnitudes of the secondary peaks in the autocorrelation of that waveform are very close to 1, such that only a small amount of noise is sufficient to make the secondary peaks difficult to distinguish from the primary peak. Accordingly, waveforms having the smallest secondary peak magnitudes provide the best possible SNR threshold behavior.

In addition to ensuring that a waveform has the β required for accurate ranging at high SNRs, the bandwidth efficient waveform design method of the present invention also ensures that the resulting waveforms meet requirements for threshold SNR by examining the autocorrelation functions of candidate waveforms and selecting only those whose autocorrelation functions that have the smallest secondary peak magnitudes.

Example of Bandwidth Efficient Waveform Design

As an example of the present invention, the design of a bandwidth efficient ranging waveform is considered for use in the United States UHF band, which has a channel width of 12.5 kHz. For this example, the goal is to replicate the ranging accuracy of a conventional PRBS ranging waveform occupying 4 MHz of bandwidth, using a bandwidth efficient waveform which minimizes the required bandwidth.

Figure 3:
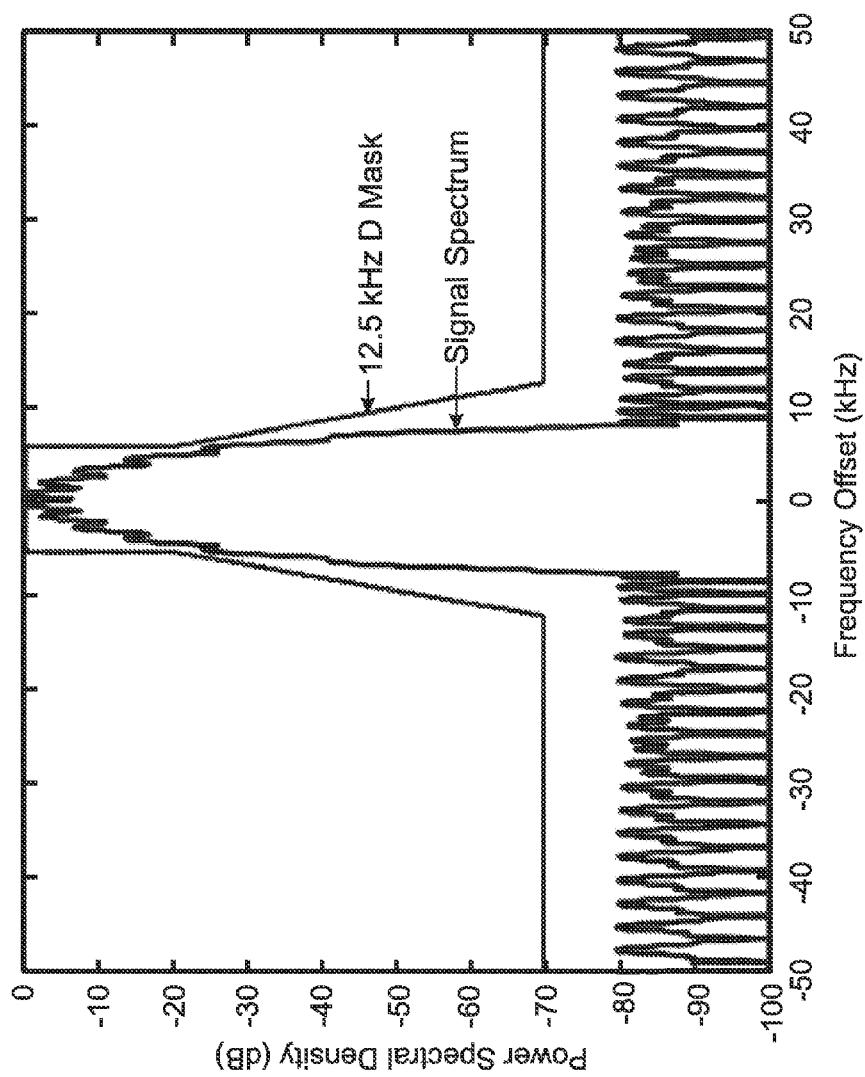
FIG. 3 is a graph of power spectral density versus frequency offset illustrating the FCC "D" mask that is applicable to 12.5 kHz channels in the United States.

At any location in the United States, there is a list of frequencies that are available in this band, where the frequencies are separated by multiples of the channel width (12.5 kHz). With the proper licenses, transmission is allowed on any of these available frequencies, subject to power limits and restrictions on the power spectrum within and around the assigned band, which is defined by a spectral mask. The FCC "D" mask applicable to 12.5 kHz channels in the United States is used in this example, and is shown in FIG. 3 (see 47 CFR 90.210).

Starting with a list of the frequency channels that are available for licensed use at the location where the ranging system will operate, combinations of these channels, also referred to herein as "bands," are selected which have a β at least as large as that required to provide the desired ranging accuracy at high SNR's. In this example, to replicate the performance of a conventional ranging waveform, combinations of 2 or more bands are selected that have β equal to or greater than the conventional waveform.

For each band combination, a corresponding candidate waveform is defined that coherently occupies the bands in the combination. In each individual band which is part of a combination, the modulation of the candidate waveform is selected to conform to the restrictions on transmission in the bands, as given in this example by the FCC "D" mask. Even when the individual bands are narrow, as in this example, it is advantageous to modulate the signals in each band to fill the spectrum allowed by the channel mask, because this modulation reduces the magnitude of secondary autocorrelation peaks at large delays.

This selection of band combinations and candidate waveforms can be accomplished, for example, by examining all possible combinations of 2 or more bands, or by limiting the search set using heuristic information. An example of useful heuristic information is choosing the frequency differences between the centers of the bands (the frequency spacings) so that there are as many unique spacings, as possible in the waveform. There are additional heuristics for many other situations which can similarly be used to increase the efficiency of the selection process. It has been found that, in many cases similar to the example presented here, from three to eight properly chosen bands are sufficient to provide the desired high SNR accuracy and threshold SNR performance.

From this (often large) set of candidate waveform combinations, a selection is made of those candidates that also have the required autocorrelation properties. Because the first selection is made using information from the power spectral density of the waveform, in embodiments the Fourier transform relation is employed between the autocorrelation and the power spectral density (Papoulis, 1963), $$r(\tau) \leftrightarrow S(\omega) \qquad (3)$$

Which allows the autocorrelation $r(\tau)$ to be computed as the inverse Fourier transform of the power spectral density $S(\omega)$ used in the first step.

According to the present method, a subset of the candidate waveforms is selected by choosing those candidate waveforms having the smallest secondary peak magnitudes.

Since there may be many candidate waveforms with similar secondary peak magnitudes, some embodiments apply additional criteria to further reduce the set of selected waveforms, such as excluding candidate waveforms for which a secondary peak falls within a specified delay region of the waveform's autocorrelation function. These additional criteria can be used, for example, to maximize resistance to multipath errors, or to enhance the ability to track the delay of a signal in a navigation system.

As an example, an additional criterion for secondary peak delay can be used to select waveforms having maximal resistance to multipath errors. Typical urban environments have multipath echoes at delays of 0 to 5 microseconds, and in mountainous environments multipath echoes may occur at delays of 0 to 50 microseconds. By ensuring that the secondary autocorrelation peaks occur at delays outside the expected range of multipath echo delays, the resistance of the selected ranging waveform to multipath errors can be improved.

Another example of the use of an additional criterion for secondary peak delay occurs in navigation systems which track the delay of an acquired signal using an early-late discriminator (Braasch & Van Dierendonk, 1999). For these systems, ensuring that the secondary autocorrelation peaks do not occur at delays near zero and near the early and late signal delays used in tracking can improve tracking performance.

An example of the result of this process is shown in FIG. 2, which compares the power spectrum of the conventional PRBS waveform 200 with a bandwidth efficient waveform 202 designed using an embodiment of the present method. The total transmitted powers and energies of the two signals are identical, as is the above-threshold ranging accuracy, but the bandwidth efficient waveform 202, which uses four 12.5 kHz wide channels, occupies 80 times less bandwidth than the conventional PRBS waveform 200.

Figure 4:
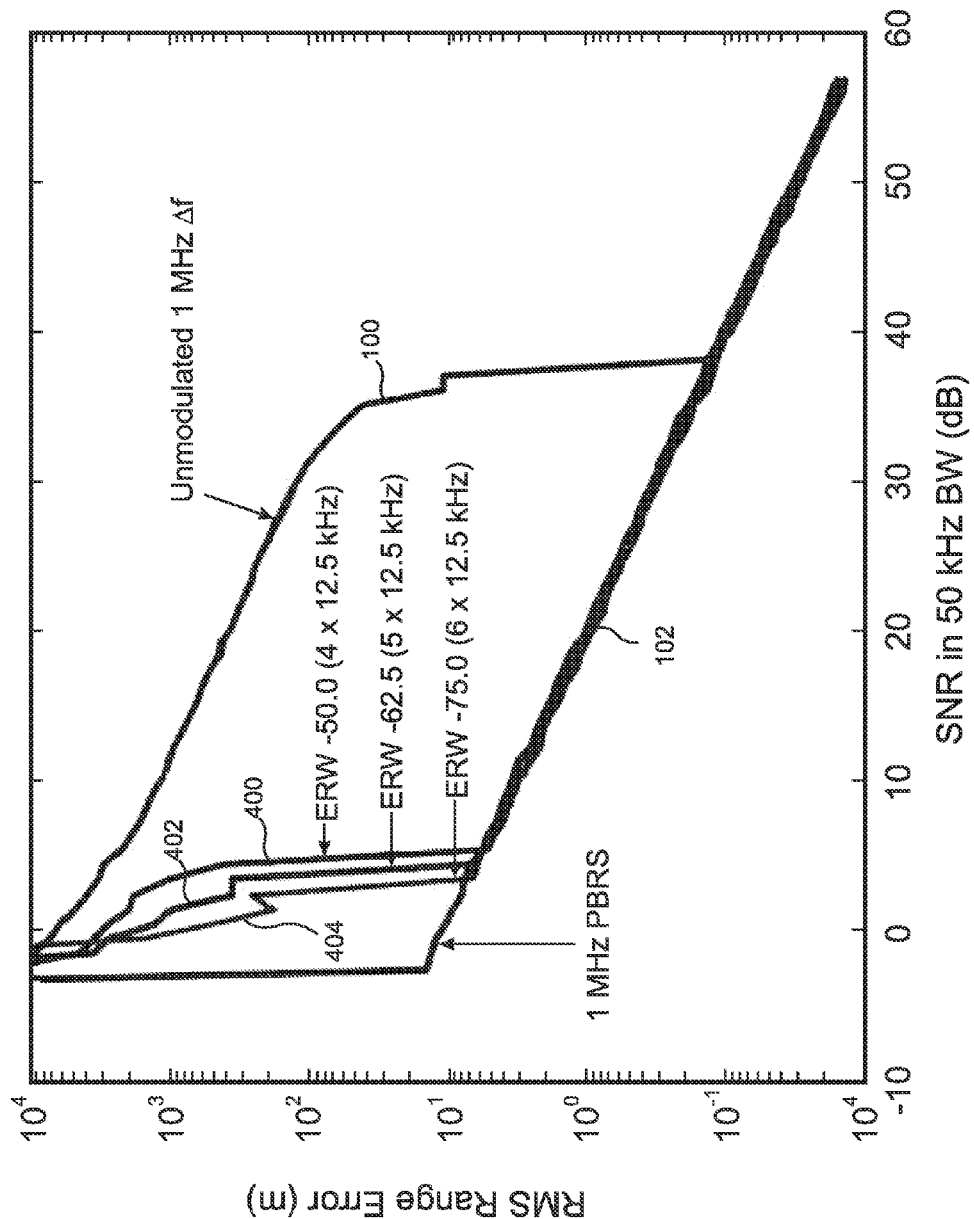
FIG. 4 is a graph of RMS range error versus SNR that compares SNR threshold behaviors of the prior art waveforms of FIG. 1 with three bandwidth efficient ranging waveforms designed using the present invention.

The SNR threshold behavior of the bandwidth efficient waveform design 202 of FIG. 2 is illustrated in FIG. 4, which compares threshold data 400 for the bandwidth efficient waveform 202 of FIG. 2 with the SNR threshold performance of the conventional PRBS waveform 102 and unmodulated sinusoids 100 of FIG. 1, and with other bandwidth efficient ranging waveforms that use five 402 and six 404 12.5 kHz channels. In contrast to the poor threshold behavior of the prior art unmodulated sinusoid example 100, the bandwidth efficient waveform design approach of the present invention yields waveforms 400, 402, 404 in this example having SNR thresholds that are only 6-9 dB lower than the prior art PRBS waveform. Above this SNR threshold, the performance of the bandwidth efficient ranging waveforms 400, 402, 404 is equivalent to the performance of the conventional waveform, which occupies 50-80 times more bandwidth.

In general, it is possible to design bandwidth efficient ranging waveforms having SNR thresholds that are arbitrarily close to a conventional waveform of the same $\beta$ by increasing the number of bands in the band combinations of the candidate waveforms. In practice, the number of bands selected typically depends on the number of frequency bands that are available, and on the required performance of the waveform at low SNR. In many cases, bandwidth efficient ranging waveforms having three to eight bands, and providing a SNR threshold that is only 1-10 dB less than a conventional waveform, have been found to provide a reasonable balance between bandwidth usage and performance.

The individual bands of a bandwidth efficient waveform of the present invention can be designed to fit within any desired communications channel mask. The examples presented in FIGS. 2 and 4 use the FCC D mask (used in the UHF band) that is illustrated in FIG. 3. Although it is not necessary, filling the space available within the allowed channel mask is advantageous because it reduces the magnitude of the secondary peaks in the autocorrelation at large delays, increasing the number of candidate waveforms with small secondary peak magnitudes.

Bandwidth efficient ranging waveforms designed according to the present invention can provide accurate ranging while occupying only a few narrow communications channels, instead of the hundreds that would be required to transmit a conventional ranging waveform.

After the power spectral densities and the autocorrelation functions of the candidate waveforms have been determined, and it has been verified that the high SNR ranging accuracy and the SNR threshold behavior of the candidate waveforms meet the specified requirements, any secondary criteria are applied (for example, requiring that the secondary peaks occur at delays outside a specified region). For this example, no secondary criteria were used.

Finally, a selection of one or more bandwidth-efficient ranging waveforms is made by choosing a "format" in which to produce the required power spectral density and autocorrelation. For example, in some embodiments a format is chosen in which the signal is present in all bands simultaneously. In other embodiments, a format is chosen in which the signal occupies each band sequentially. Either of these approaches will produce waveforms with the required performance, as long as transmission is coherent across all the bands (that is, the phase relationships between signals in each of the bands are known).

In some embodiments, the modulation within the individual bands is chosen to have other desired properties. For example, in certain embodiments multiple simultaneous transmissions share a set of bands, and the individual transmitters employ different modulating waveforms with good cross-correlation properties, as is common practice in navigation systems which use multiple transmitters simultaneously.

In various embodiments, the bands are transmitted sequentially in a given pseudorandom order, either for the purposes of avoiding interference between users, or for making the signal more difficult to jam.

SUMMARY

Figure 5:
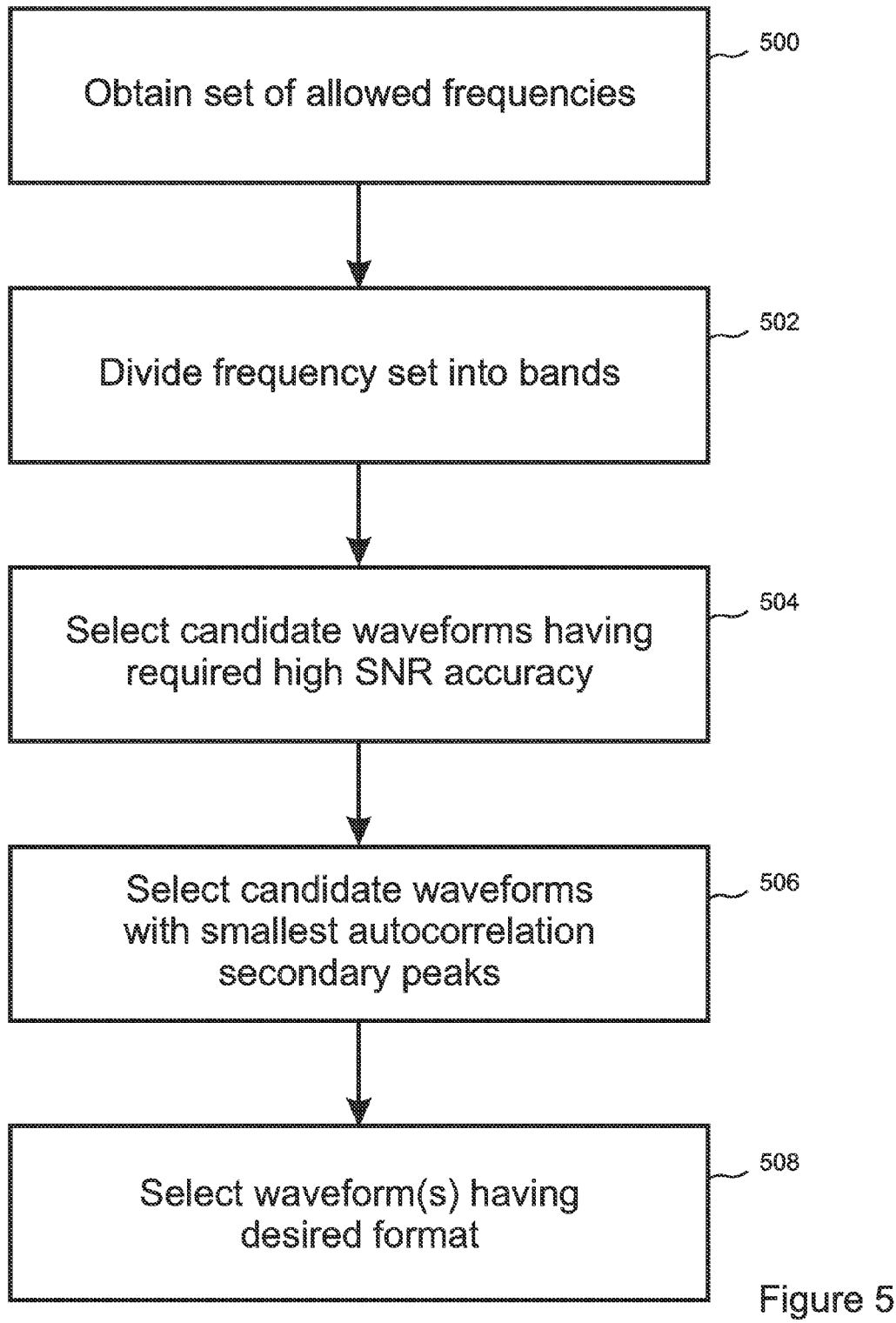
FIG. 5 is a block diagram that illustrates steps included in an embodiment of the method of the present invention.

With reference to FIG. 5, following is a summary of the design method for bandwidth efficient ranging waveforms of the present invention:

1. For the spectral region where the ranging waveforms are to be used, obtain the set of frequencies in which transmission of ranging waveforms is allowed (the allowed frequencies) 500. In some cases, the allowed frequencies may be described by a list of center frequencies and a channel width. The allowed frequencies may be composed of either a single, contiguous range of frequencies or of multiple, noncontiguous frequency ranges.

2. Divide the allowed frequencies into frequency bands (the band set) 502. For the case where the allowed frequencies are described by a set of center frequencies and a channel width, it is often convenient to use frequency bands of the same width as the channel width. The division into channels is often specified by the laws or regulations governing the use of the frequency spectrum.

3. From all possible noncontiguous combinations of two or more bands from the band set, select a subset of band combinations for which the bandwidth $\beta$ of the combination provides the required high SNR ranging accuracy according to equation (2) (the high SNR band subset) 504.

4. For each band combination in the high SNR band subset, calculate the autocorrelation of a waveform transmitted coherently in the bands of the combination, and select those band combinations that have the smallest secondary peak magnitudes and meet any additional secondary criteria on secondary peak location (the threshold band subset) 506.

5. Select coherent waveforms that occupy the band combinations of the threshold band subset and satisfy specified factor criteria, such as simultaneous or sequential transmission within the bands, the order of sequential transmission, and/or the modulation of the individual bands, as required by other design factors 508.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications without departing from the spirit thereof. The disclosure presented herein does not explicitly disclose all possible combinations of features that fall within the scope of the invention. The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

I claim:

1. A method of transmitting a bandwidth efficient ranging waveform, the method comprising:
   designing a bandwidth efficient ranging waveform by:
      obtaining a set of allowed frequencies available for transmission of the bandwidth efficient ranging waveform, said allowed frequencies being associated with corresponding regulatory restrictions on transmission power;
      determining format criteria and a required ranging accuracy for the bandwidth efficient ranging waveform as a function of signal-to-noise ratio (SNR);
      dividing the set of allowed frequencies into a band set that includes a plurality of frequency bands, at least two of which are noncontiguous;
      From among all possible band combinations having two or more noncontiguous bands from the band set, selecting a plurality of candidate band combinations having band widths that provide the required ranging accuracy as a function of SNR, each candidate band combination coherently occupying a noncontiguous combination of at least two of the frequency bands;
      for each of the candidate band combinations, computing an autocorrelation function of a corresponding candidate waveform transmitted coherently in the bands of the candidate band combination, modulation of the candidate waveform being selected to conform to the regulatory restrictions on transmission power of the allowed frequencies in the bands of the candidate band combination, each autocorrelation function having a primary peak and at least one secondary peak;
      selecting from among the plurality of candidate waveforms a set of selected candidate waveforms, the selected candidate waveforms being those waveforms for which the secondary peaks of the corresponding autocorrelation functions have the smallest magnitudes; and
      selecting the bandwidth efficient ranging waveform from among the selected candidate waveforms according to the format criteria; and
   causing a ranging apparatus to transmit the bandwidth efficient ranging waveform.

2. The method of claim 1, wherein the format criteria include a requirement that signal is transmitted simultaneously in all bands of the bandwidth efficient ranging waveform.

3. The method of claim 1, wherein the format criteria include a requirement that signal is transmitted sequentially in all bands of the bandwidth efficient ranging waveform.

4. The method of claim 3, wherein the format criteria include a requirement that signal is transmitted sequentially in all bands of the bandwidth efficient ranging waveform in a given pseudorandom order.

5. The method of claim 1, wherein the format criteria include a requirement to exclude all selected candidate waveforms for which a secondary peak of the corresponding autocorrelation function falls within one or more specified delay ranges.

6. The method of claim 1, wherein the selected bandwidth efficient ranging waveform occupies between three and eight frequency bands.

7. The method of claim 1, wherein the selected bandwidth efficient ranging waveform has a SNR threshold that is within 10 dB of a SNR threshold of a contiguous ranging waveform having a $\beta$ value that is equal to a $\beta$ value of the selected bandwidth efficient ranging waveform.

8. The method of claim 1, wherein the frequency bands correspond with frequency channels that are approximately 12.5 kHz wide.

9. The method of claim 1, wherein the frequency bands correspond with frequency channels that are approximately 25 kHz wide.

10. The method of claim 1, wherein the frequency bands correspond with frequency channels that are approximately 6.25 kHz wide.

11. The method of claim 1, wherein selecting the bandwidth efficient ranging waveform from among the selected candidate waveforms includes selecting a plurality of the selected candidate waveforms and configuring the bandwidth efficient ranging waveform to transition between the selected candidate waveforms at specified time intervals.

* * * * *